United States Patent [19]

Willis

[11] 4,262,232
[45] Apr. 14, 1981

[54] COLOR TELEVISION DEGAUSSING CIRCUIT

[75] Inventor: Donald H. Willis, Indianapolis, Ind.
[73] Assignee: RCA Corp., New York, N.Y.
[21] Appl. No.: 99,152
[22] Filed: Nov. 30, 1979
[51] Int. Cl.$^3$ ............................................. H04N 9/29
[52] U.S. Cl. ...................................... 315/8; 361/150
[58] Field of Search ................... 315/8, 205; 361/150, 361/267

[56] References Cited

U.S. PATENT DOCUMENTS

| | | | |
|---|---|---|---|
| 3,333,143 | 7/1967 | Van Anrooy et al. | 315/8 |
| 3,344,307 | 9/1967 | Van Anrooy et al. | 315/8 |
| 3,404,307 | 10/1968 | Hayden | 315/8 |
| 3,555,343 | 1/1971 | Allen | 315/8 |
| 3,571,652 | 3/1971 | Shiobara et al. | 315/8 |
| 3,582,721 | 6/1971 | Van Hoorn et al. | 361/150 |
| 4,164,775 | 8/1979 | Slegers | 361/150 |

Primary Examiner—Eugene R. LaRoche
Attorney, Agent, or Firm—Eugene M. Whitacre; Paul J. Rasmussen; Joseph J. Laks

[57] ABSTRACT

A degaussing network of a remote controlled color television receiver is energized by a remote-responsive power supply rather than by the contact closure of a mechanical or electromechanical switch. The power supply includes a series-pass semiconductor element for developing a direct current voltage at an output terminal of the power supply derived from a source of alternating current voltage coupled across two input terminals. The regulator control circuit for the semiconductor element is responsive to the state of an on/off command signal. The power supply operates during the on-state of the command signal to provide the direct current voltage at the output terminal. The power supply regulator control circuit maintains the semiconductor element nonconductive in the off-state. The degaussing network, including a degaussing winding and a thermistor, is coupled to the output terminal of the power supply. First and second diodes in conjunction with corresponding diodes of the power supply rectifier circuit guide current from the AC source through the regulator semiconductor element in alternate directions within the degaussing winding in order to generate the required alternating degaussing magnetic flux. When the on-state of the command signal is applied to the regulator control circuit to initiate conduction of the semiconductor element, degaussing current begins to flow in the degaussing winding. The degaussing current is substantially reduced after the thermistor heats up.

6 Claims, 5 Drawing Figures

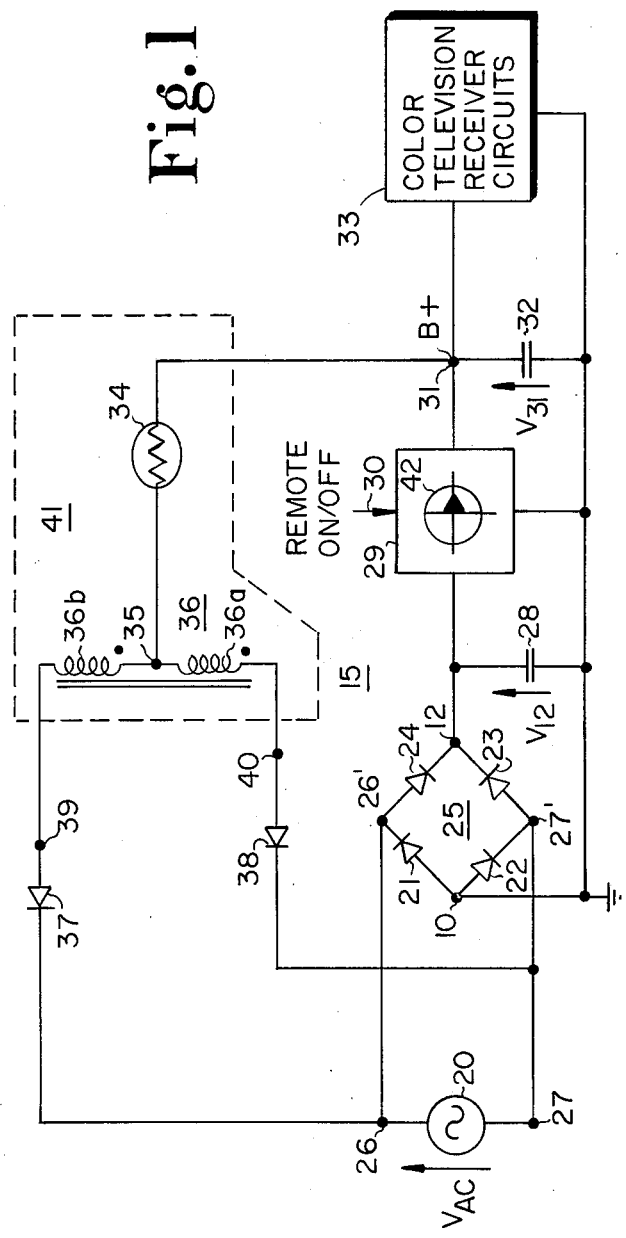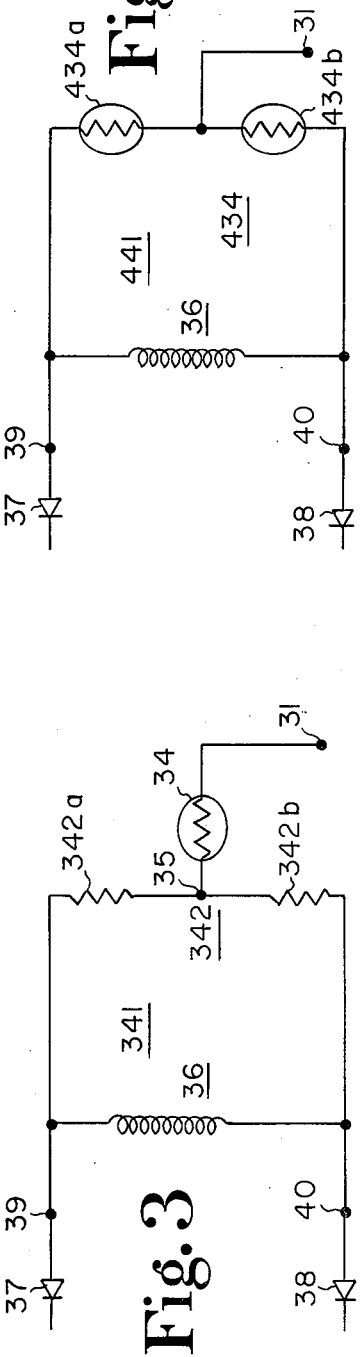

COLOR TELEVISION DEGAUSSING CIRCUIT

This invention relates to color television degaussing circuits.

To maintain color purity in a color television receiver, magnetic fields other than those proposed by the neck components of the color picture tube must be neutralized. The undesirable fields may be produced by external factors such as the presence of the earth's magnetic field, operation of transformers and motors, or by undesirable magnetization of color television receiver components such as the shadow mask and support housing. A magnetic shield is typically provided to shield the electron beams within the color television receiver picture tube from external magnetic fields.

When turning on the television receiver, an automatic degaussing circuit develops a degaussing magnetic flux to degauss the magnetic shield and magnetizable color television receiver components. A degaussing winding is arranged in series with the AC power line source and the television receiver mechanical on/off switch. When the on/off switch is placed in the on position, the AC source voltage is developed across the degaussing network to produce an alternating current in the degaussing winding. A thermistor in series with the degaussing winding causes an amplitude decay of the degaussing current as the thermistor heats up.

In remote controlled television receivers, the mechanical on/off switch may be replaced by an electromechanical relay. Such a relay must operate without relay chatter to conduct both the degaussing current, which typically may exceed 5 to 10 amperes, and the initial power supply surge current which charges the power supply filter capacitors.

In general, to eliminate the electromechanical on/off switch, some remote control television receiver circuits provide for a main power supply regulator which is responsive to remote on/off command signals. When a turn-off command signal is received, the regulator removes operative voltage that powers some of the television receiver circuits that are needed to provide picture and sound, thereby effectively turning off the television receiver. When receiving a turn-on command signal, the regulator begins to supply the operative voltage, thereby effectively turning on the television receiver.

Television receivers which use remote-responsive power supplies for receiver turn-on and turn-off may have the AC power line source directly connected to the power supply rectifier elements both in the on and in the off-state of the television receiver. With such television receivers, the degaussing circuit can no longer be connected directly across the AC power line input terminals because of the absence of a mechanical or electromechanical switch to disconnect the degaussing circuit upon television turn-off.

A feature of the invention is to provide automatic degaussing of a remote controlled color television receiver which does not have a mechanical or electromechanical on/off switch. Another feature of the invention is to use the on/off capability of a remote-responsive power supply to energize both the degaussing circuit and television receiver circuits requiring B+ voltage from the power supply. Still another feature is the use of the power supply regulator to initiate the degaussing action.

In an inventive arrangement, a rectifier circuit in a color television receiver, for example, is coupled to first and second terminals of an alternating current voltage source to develop a direct current voltage at a rectifier circuit output terminal. A switch, subject to enablement during normal receiver operation, has a main conducting path coupled to the output terminal and a degaussing winding. A first unidirectional current conducting device, independent of the rectifier circuit elements, establishes during alternate half cycles of the alternating current voltage a first path for the flow of current from the first terminal of the voltage source via the rectifier circuit, the main conducting path of the switch, the degaussing winding, the first unidirectional current conducting device to the second terminal of the voltage source. A second unidirectional current conducting device, independent of the rectifying circuit, establishes a second path for the flow of current from the second terminal to the first terminal during the intervening half cycles of the alternating current voltage via the rectifying circuit, the main current conducting path, the degaussing winding and the second unidirectional current conductive device. The current flowing in the second path produces a degaussing flux of an opposite polarity to the polarity of the degaussing flux produced by the current flowing in the first path.

FIG. 1 illustrates a color television receiver power supply circuit including a degaussing network embodying the invention;

FIG. 3 illustrates the power supply circuit of FIG. 1 including another embodiment of a degaussing network;

FIG. 4 illustrates the power supply circuit of FIG. 1 including still another embodiment of a degaussing network.

Figure 2:
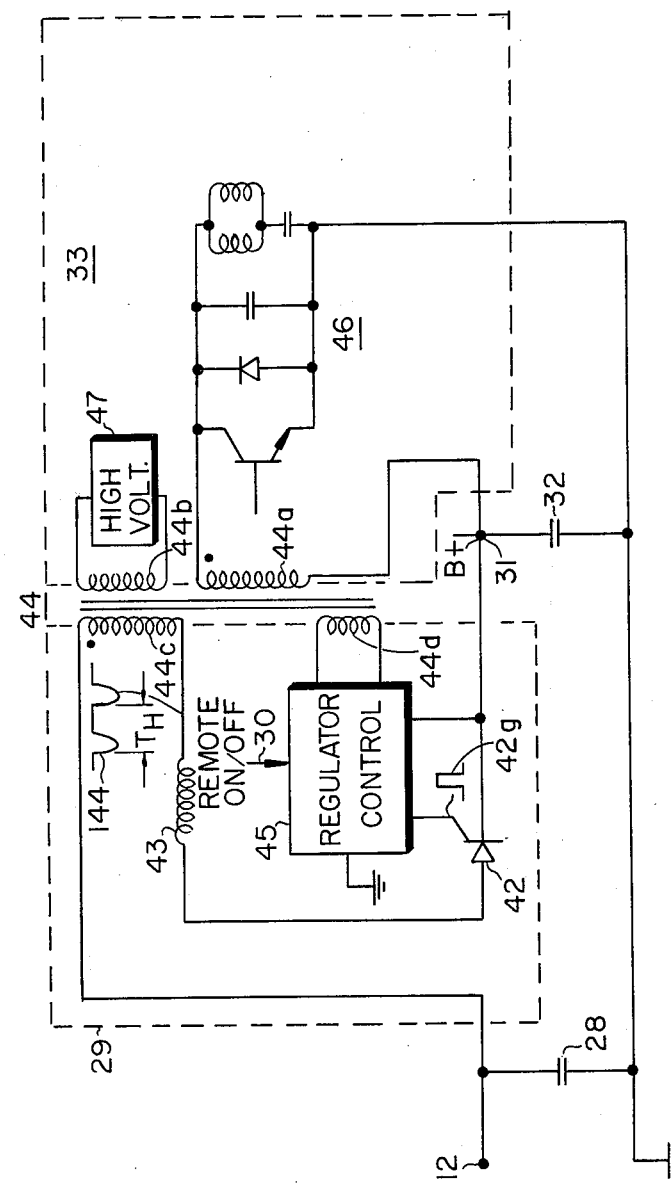
FIG. 2 illustrates a portion of the power supply circuit of FIG. 1 including embodiments of a power supply regulator and several color television receiver circuits energized by the power supply circuit.

In FIG. 1, a source 20 of alternating current voltage, such as an AC power line supply, is coupled across input terminals 26 and 27 of a color television receiver power supply circuit 15. Input terminals 26 and 27 are connected, respectively, to terminals 26' and 27' of a full-wave bridge rectifier 25, comprising appropriately poled diodes 21–24. A filter capacitor 28 is coupled across output terminals 10 and 12 of full-wave rectifier 25, with terminal 10 serving as a ground or common current return terminal. A filtered but unregulated DC input voltage $V_{12}$ relative to ground is developed at terminal 12.

Input voltage $V_{12}$ is applied to a power supply regulator 29 for developing a regulated B+ operating voltage at a terminal 31. A filter capacitor 32 is coupled between terminal 31 and ground, with the B+ operating voltage equaling the voltage $V_{31}$ developed across filter capacitor 32. The B+ operating voltage developed at terminal 31 energizes various color television receiver circuits, illustrated in FIG. 1 generally as a block 33. Ground terminal 10 serves as the common current return for these color television receiver circuits.

Power supply regulator 29 may be designed as a remote-responsive switching regulator such as disclosed in copending U.S. patent application Ser. No. 080,839, filed Oct. 1, 1979, D. H. Willis, entitled "HIGH VOLTAGE DISABLING CIRCUIT FOR A TELEVISION RECEIVER", hereby incorporated by reference. Power supply regulator 29 is responsive to a remote on/off command signal applied to the regulator along a conductor line 30. To turn on the color television receiver, the on-state of the command signal is applied along conductor line 30 to initiate and enable normal switching action of the regulator. A B+ operating voltage is developed at terminal 31 and energizes the color television receiver circuits 33. To turn off the color television receiver, the off-state of the command signal is applied along conductor line 30 and disables normal switching action of the regulator. B+ operating voltage is removed from terminal 31 thereby deenergizing the circuits 33.

With regulator 29 of power supply 15 controlling the turn-on and turn-off of the color television receiver, AC power line source 20 may be directly connected to terminals 26' and 27' of full-wave rectifier 25, without an intervening mechanical or electromechanical switch.

p As illustrated in FIG. 2, switching regulator 29 includes a series-pass semiconductor element, SCR 42, coupled to terminal 12 through an inductor 43 and a winding 44c of a horizontal or flyback transformer 44. The cathode of SCR 42 is coupled to the B+ operating terminal 31. Switching regulator 29 is operating at the horizontal deflection rate, $1/T_H$, by gating SCR 42 into conduction each horizontal trace interval. When a gating pulse 42g is applied to the gate of the SCR by regulator control circuit 45 within each horizontal trace interval, current flows from terminal 12 through SCR 42 to charge filter capacitor 32. SCR 42 is commutated out of conduction within each horizontal retrace interval by a negative retrace pulse 144 developed in flyback transformer winding 44c. Synchronization of the gating pulses with horizontal deflection is provided by applying to control circuit 45 the pulse voltage developed in a flyback transformer winding 44d. Regulation of a receiver energy level, such as the B+ operating voltage at terminal 31, is provided by feeding back the B+ voltage to control circuit 45. Variations in the B+ voltage will cause the turn-on instant of SCR 42 to vary within each horizontal trace interval, thereby providing the required regulating action.

To turn the color television receiver on and off, regulator control circuit 45 is made responsive to the state of an on/off command signal applied to the regulator control circuit along a conductor line 30. The on/off command signal may be developed by conventional remote control circuitry, not illustrated. Upon initiation of the off-state of the command signal, regulator control circuit 45 removes gating pulses 42g, causing SCR 42 to remain nonconductive after last being commutated off.

With SCR 42 nonconductive, the direct current path from terminal 12 to B+ terminal 31 is blocked, thereby removing B+ operative power from terminal 31, deenergizing color television receiver circuits 33 and turning off the television receiver. Upon initiation of the on-state of the command signal, regulator control circuit 45 is enabled and provides the gating pulses 42g to enable conduction of SCR 42. Operative B+ voltage is developed at terminal 31, energizing television receiver circuits 33 and turning on the television receiver.

FIG. 2 illustrates some of the circuits within block 33 that are energized by the operative B+ voltage. These circuits include a conventional horizontal deflection generator 46 coupled to a primary winding 44a of flyback transformer 44 and a conventional high voltage circuit 47 coupled to a high voltage winding 44b of flyback transformer 44.

To provide for automatic degaussing upon remote turn-on of the color television receiver, a degaussing network 41 is provided, as illustrated in FIG. 1. Degaussing network 41 comprises a degaussing winding 36 and a positive temperature coefficient impedance, thermistor 34. Degaussing winding 36 comprises two coils 36a and 36b connected together at a junction terminal 35. Degaussing winding 36 may be of conventional construction similar to that disclosed in U.S. Pat. No. 3,322,998, R. R. Norley, entitled "COLOR PURITY CORRECTING APPARATUS FOR COLORED TELEVISION PICTURE TUBES", or that disclosed in U.S. Pat. No. 3,867,668, T. M. Shrader, entitled "*CATHODE RAY TUBE HAVING AN INTERNAL/EXTERNAL MAGNETIC SHIELD AND DEGAUSSING COMBINATION*".

Thermistor 34 is coupled between B+ terminal 31 and junction terminal 35. The terminal of degaussing coil 36a that is remote from terminal 35 is coupled to a terminal 40, and the terminal of degaussing coil 36b that is remote from terminal 35 is coupled to a terminal 39. The anode of a diode 37 is coupled to terminal 39 and the cathode of that diode is coupled to input terminal 26 of AC voltage source 20. The anode of a diode 38 is coupled to terminal 40 and the cathode of that diode is coupled to input terminal 27 of source 20. The diodes 37 and 38 are provided in the circuit of FIG. 1 independently of the diodes of rectifier 25.

Figure 5:
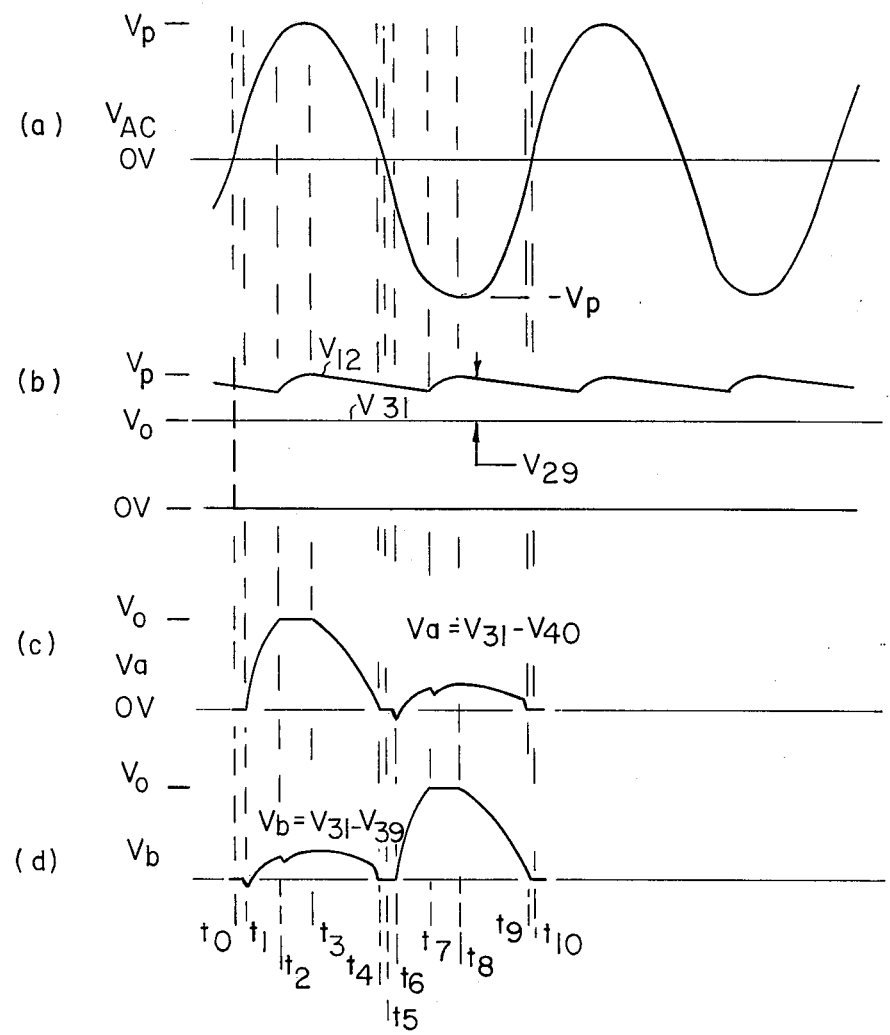
FIG. 5 illustrates waveforms associated with the circuit of FIG. 1.

The voltage $V_{AC}$ developed by power line source 20 is illustrated in FIG. 5a and illustrates the voltage at terminal 26 of FIG. 1 relative to the voltage at terminal 27. With the television receiver in the off-state, full-wave rectifier 25 charges filter capacitor 28 to the peak magnitude voltage, $V_p$, of the AC source. After application of a turn-on command signal along conductor line 30, a B+ operating voltage is developed at terminal 31. The B+ voltage energizes color television receiver circuits 33. Subsequently, after the elapse of several cycles of the alternating current voltage $V_{AC}$, the unregulated input voltage $V_{12}$ assumes a DC voltage level with a superimposed AC ripple component of twice the power line frequency.

As illustrated in FIG. 5a by the voltage $V_{AC}$ and FIG. 5b by the voltage $V_{12}$, by time $t_2$ within the positive polarity interval $t_0$–$t_5$ of the alternating current voltage $V_{AC}$, the voltage $V_{12}$ has decreased sufficiently, due to load current discharging of capacitor 28, to enable both diodes 22 and 24 of rectifier 25 to conduct. The AC power line source 20 charges capacitor 28 between times $t_2$ and $t_3$, with the capacitor reaching a peak magnitude voltage $V_p$ at time $t_3$, neglecting the impedances of the AC power line source 20 and of diodes 21–24. Between times $t_3$ and $t_7$, the voltage $V_{12}$ decreases as capacitor 28 is discharged by the load current supplying power to color television receiver circuits 33. At a time $t_7$ within the negative polarity interval $t_5$–$t_{10}$ of the alternating current voltage $V_{AC}$, the voltage $V_{12}$ has decreased sufficiently to enable both diodes 21 and 23 of rectifier 25 to conduct. During the interval $t_7$–$t_8$, capacitor 28 is charged by the AC voltage source 20 to a peak magnitude $V_p$.

With regulator 29 providing switching action, a DC current path is established between terminals 12 and 31, the input and output terminals, respectively, of regulator 29. A voltage $V_{29}$ is established across the input and output terminals equal to the difference between the unregulated input voltage $V_{12}$ and the regulated B+ operative voltage $V_{31}$ of magnitude $V_0$, as illustrated in FIG. 5b.

With the DC current path between terminals 12 and 31 establishes after remote television receiver turn-on, degaussing current from AC source 20 can flow to the degaussing network 41 through semiconductor element 42 and output terminal 31—provided the appropriate ones of diodes 21–24 and diodes 37 and 38 are conducting. After time $t_1$ of FIGS. 5a–5d, the now positive polarity voltage $V_{AC}$ is of greater magnitude than the voltage drop $V_{29}$ developed across the input and output terminals 12 and 31 of regulator 29. Diode 24 of full-wave bridge rectifier 25 and diode 38 become forward biased and conduct degaussing current through thermistor 34 and degaussing coil 36a.

The voltage $V_a$ is illustrated in FIG. 5c and equals the difference between the voltages at terminal 31 and terminal 40. After time $t_1$, when both diodes 24 and 38 are conductive, the voltage $V_a$ equals the source voltage $V_{AC}$ less the voltage drop $V_{29}$ across the regulator 29. Degaussing current begins to flow in thermistor 34 and coils 36a of degaussing network 41, in a first DC current path beginning, for example, at input terminal 26 of AC source 20, continuing via diode 24 of full-wave bridge rectifier 25, semiconductor element 42, thermistor 34, coil 36a, diode 38, input terminal 27 of AC source 20 back to terminal 26.

At time $t_2$, diode 22 of full-wave bridge rectifier 25 becomes forward biased. Between times $t_2$–$t_3$, when both diodes 22 and 24 of full-wave bridge rectifier 25 are conducting, the voltage $V_{12}$ at terminal 12 equals the voltage $V_{AC}$ as capacitor 28 is being charged by the AC voltage source. To maintain a constant B+ operating voltage of $V_0$ at terminal 31, regulator 29 operates to increase the voltage $V_{29}$ to compensate for the increase in voltage at terminal 12, as illustrated by the waveform $V_{29}$ of FIG. 2b. During the interval $t_2$–$t_3$, the voltage $V_a$ applied across degaussing network 41 equals the voltage at B+ operating terminal 31, as the voltage $V_{AC}$ less the voltage $V_{29}$ equals the regulated voltage $V_0$ during this interval.

After time $t_3$, after the peak of the positive polarity portion of the voltage $V_{AC}$ has passed, diode 22 of full-wave bridge rectifier 25 becomes reverse biased, and the voltage $V_a$ begins to decrease and follow the decreasing AC input voltage, as illustrated in FIG. 5c between times $t_3$–$t_4$. At time $t_4$, the voltage $V_{AC}$ has decreased in magnitude to less than the voltage $V_{29}$ developed across regulator circuit 29. Diodes 24 and 38 become reverse biased, and degaussing current ceases to flow in network 41.

Within the negative polarity interval of the voltage $V_{AC}$, degaussing current will begin to flow at time $t_6$ of FIGS. 5a–5d when diode 37 and diode 23 of full-wave bridge rectifier 25 become forward biased. These diodes become forward biased after time $t_6$ because the magnitude of the negative polarity voltage $V_{AC}$ is greater than the magnitude of the voltage drop $V_{29}$ across regulator 29. The voltage applied to degaussing network 41 after time $t_6$ equals the difference in magnitudes between the voltage $V_{AC}$ and the voltage $V_{29}$, as illustrated in FIG. 5d by the voltage $V_b$, where $V_b$ equals the difference in voltage between terminals 31 and 39. Between times $t_7$–$t_8$, as the voltage $V_{29}$ increases to compensate for the increasing voltage at terminal 12, the voltage $V_b$ applied to degaussing network 41 equals the B+ operating voltage at terminal 31. Between times $t_8$–$t_9$, the voltage $V_b$ applied to degaussing network 41 decreases, equaling the difference in magnitude between $V_{AC}$ and $V_{29}$. At time $t_9$, both diodes 23 and 37 become reversed biased as the voltage $V_{AC}$ has decreased in magnitude below that of the voltage $V_{29}$.

Within each cycle of the alternating current voltage $V_{AC}$, degaussing current flows in alternating directions within degaussing winding 36. Between times $t_1$–$t_4$, within the positive polarity interval of the voltage $V_{AC}$, degaussing current flows from terminal 35 through coil 36a to terminal 40 as described previously. Between times $t_6$–$t_9$ within the negative polarity interval of the voltage $V_{AC}$, degaussing current flows in a second DC current path, beginning, for example, at input terminal 27 of AC source 20, continuing via diode 23 of full-wave length bridge rectifier 25, semiconductor element 42, thermistor 34, coil 36b, diode 37, input terminal 26 of AC source 20 and back to terminal 27.

With the anodes 37 and 38 connected to alternate ones of the input terminals 26 and 27, and with thermistor 34 connected to output terminal 31, alternate polarities of the voltage $V_{AC}$ first switch diodes 38 and 24 into conduction and then diodes 37 and 23 into conduction. Degaussing current flows from output terminal 31 through alternate paths in the degaussing winding 36 to alternate ones of the AC voltage source input terminals 26 to 27.

The flow of degaussing current in the second one of the aforementioned DC current paths produces a degaussing flux of an opposite polarity to that of the degaussing flux produced by the flow of degaussing current in the first-mentioned DC current path. The degaussing flux slowly decays in amplitude as thermistor 34 heats up and increases in resistance. When the television receiver is turned off by application of the off-state of the command signal to regulator circuit 29, semiconductor element 42 is made nonconductive and blocks the flow of current to degaussing network 41. Thermistor 34 cools and its resistance decreases, thereby enabling the degaussing action to be reinitiated when the television receiver is next turned on.

Diodes 37 and 38, as well as diodes 21–24, are reverse biased during the interval when the magnitude of the voltage $V_{AC}$ is less than the voltage $V_{29}$. Thus, the voltages $V_a$ and $V_b$ are both zero between times $t_0$–$t_1$, $t_4$–$t_6$, and $t_9$–$t_{10}$. During the interval $t_6$–$t_9$, when diode 37 conducts degaussing current from coil 36b, the voltage $V_a$ equals the IR voltage drop across thermistor 34 algebraically added to the induced voltage developed across coil 36a by current flowing in coil 36b, as illustrated in FIG. 5c. During the interval $t_1$–$t_4$, when diode 38 conducts degaussing current from coil 36a, the voltage $V_b$ equals the IR voltage drop across thermistor 34 algebraically added to the induced voltage developed across coil 36b by current flowing in coil 36a, as illustrated in FIG. 5d. The amplitudes of the voltage $V_a$ between times $t_6$–$t_9$ and the voltage $V_b$ between times $t_1$–$t_4$ is illustrated in FIGS. 5c and 5d at a typical thermistor temperature. The amplitudes will decrease as the thermistor heats up.

FIG. 3 illustrates another embodiment of a degaussing network which may be coupled between terminals 31, 39 and 40 of the circuit of FIG. 1 and which is energized by remote operation of regulator circuit 29 of FIG. 1. In the degaussing network 341 of FIG. 3, degaussing winding 36 is coupled across terminals 39 and 40. A voltage divider 342, comprising resistors 342a and 342b, is coupled across degaussing winding 36. Thermistor 34 is coupled between output terminal 31 and terminal 35, the junction of voltage dividing resistors 342*a* and 342*b*. Current flows from terminal 31 through thermistor 34 to terminal 35. When diode 37 conducts, during alternate half cycles of the voltage $V_{AC}$, current flows from terminal 35 through resistor 342*b* and degaussing winding 36 to terminal 39. Current also flows from terminal 35 to terminal 39 in a parallel path through resistor 342*a*. When diode 38 conducts, during the intervening half cycles of the voltage $V_{AC}$, current flows from terminal 35 to terminal 40 through resistor 342*a* and degaussing winding 36. Current also flows from terminal 35 to terminal 40 in a parallel path through resistor 342*b*. An advantage of the arrangement of degaussing network 341 is that degaussing winding 36 does not have to be split into two coils. Twice the amount of current, however, must flow from terminal 31 to terminal 35 in the circuit of FIG. 3 when compared to the amount of current flowing between the same two terminals in the circuit of FIG. 1.

FIG. 4 illustrates still another degaussing network 441 which may be coupled between terminals 31, 39 and 40 in the circuit of FIG. 1. Degaussing coil 36 is coupled between terminals 39 and 40, and a voltage divider 434 comprising the series arrangement of thermistors 434*a* and 434*b* is coupled across degaussing winding 36. Output terminal 31 is now directly connected to the junction of the two thermistors. When diode 37 conducts, during alternate half cycles of the voltage $V_{AC}$, current flows from terminal 31 through thermistor 434*b* and degaussing winding 36 to terminal 39. Current also flows from terminal 31 to terminal 39 in a parallel path through thermistor 434*a*. When diode 38 conducts, during the intervening half cycles of the voltage $V_{AC}$, current flows from terminal 31 to terminal 40 through thermistor 434*a* and degaussing winding 36. Current also flows from terminal 31 to terminal 40 in a parallel path through thermistor 434*b*. An advantage of a degaussing network arranged as illustrated in FIG. 4 is that a greater magnitude degaussing current can flow in winding 36 for a given voltage applied across the network than that of the network arranged as illustrated in FIG. 3. Close temperature coupling and matching of the temperature characteristics of thermistors 434*a* and 434*b* may be necessary for proper degaussing operation.

What is claimed is:

1. A color television receiver degaussing system, comprising:

a voltage source having first and second terminals across which an alternating current voltage is developed;

rectifying means coupled to said first and second terminals for developing a direct current voltage at an output terminal of said rectifying means;

a degaussing winding;

switching means having a main current conducting path coupled between said output terminal and said degaussing winding and subject to enablement during normal receiver operation;

means including first unidirectional current conducting means independent of said rectifying means, for establishing during alternate half cycles of said alternating current voltage a first path for the flow of current from said first terminal of said voltage source via said rectifying means, said main current conducting path of said switching means, at least a portion of said degaussing winding, and said first unidirectional current conducting means to said second terminal of said voltage source; and means including second unidirectional current conducting means independent of said rectifying means, for establishing during the intervening half cycles of said alternating current voltage a second path for the flow of current from said second terminal of said voltage source via said rectifying means, said main current conducting path of said switching means, at least a portion of said degaussing winding, and said second unidirectional current conducting means to said first terminal of said voltage source, the current flowing in said second path producing a degaussing flux of an opposite polarity to the polarity of the degaussing flux produced by the current flowing in said first path.

2. A system according to claim 1 including a control circuit coupled to said switching means and responsive to an on/off command signal for enabling conduction of said main current conducting path in a on-state of said command signal, said control circuit further responsive to a signal representative of variations of a receiver energy level for varying the conduction of said switching means to regulate said energy level.

3. A system according to claim 2 including a first thermistor coupled to said degaussing winding for producing a decay of current flowing in said degaussing winding.

4. A system according to claim 3 wherein said degaussing winding comprises two coils, a first terminal of each coil coupled to said first thermistor, a second terminal of each coil being coupled to a different one of said first and second unidirectional current conducting means.

5. A system according to claim 3 including a voltage divider coupled across said degaussing winding, said first thermistor being coupled to a junction terminal of said voltage divider.

6. A system according to claim 3 including a second thermistor series arranged with said first thermistor, said output terminal being coupled to a junction terminal of the series arrangement of said first and second thermistors, said degaussing winding being coupled across said series arrangement.

* * * * *

UNITED STATES PATENT AND TRADEMARK OFFICE
CERTIFICATE OF CORRECTION

PATENT NO. : 4,262,232

DATED : April 14, 1981

INVENTOR(S) : Donald H. Willis

It is certified that error appears in the above-identified patent and that said Letters Patent is hereby corrected as shown below:

Col. 3, line 18, delete "p". Col. 5, line 4, "establishes" should read -- established --. Col. 6, line 15, delete "length". Col. 8, line 31, "a" should read -- the --.

Signed and Sealed this

Thirteenth Day of October 1981

[SEAL]

Attest:

Attesting Officer

GERALD J. MOSSINGHOFF

Commissioner of Patents and Trademarks